United States Patent [19]

Mace et al.

[11] Patent Number: 5,004,508

[45] Date of Patent: Apr. 2, 1991

[54] THERMALLY DISSIPATED SOLDERING FLUX

[75] Inventors: Everitt W. Mace, Hutto; Janet Sickler, Georgetown; Varadarajan Srinivasan, Austin, all of Tex.

[73] Assignee: International Business Machines Corporation, Armonk, N.Y.

[21] Appl. No.: 449,647

[22] Filed: Dec. 12, 1989

[51] Int. Cl.$^5$ .............................................. B23K 34/35
[52] U.S. Cl. ........................................................ 148/22
[58] Field of Search ..................................... 148/22–25

[56] References Cited

U.S. PATENT DOCUMENTS

| | | | |
|---|---|---|---|
| 3,003,901 | 10/1961 | Marcell | 148/23 |
| 3,127,290 | 3/1964 | Konig | 148/23 |
| 3,796,610 | 3/1974 | Sarnachi | 148/25 |
| 3,944,123 | 3/1976 | Jacobs | 228/223 |
| 4,168,996 | 9/1979 | Zado | 148/23 |
| 4,278,479 | 7/1981 | Anderson et al. | 148/23 |
| 4,661,173 | 4/1987 | Barajas et al. | 148/24 |
| 4,738,732 | 4/1988 | Anderson et al. | 148/23 |
| 4,752,027 | 6/1988 | Gschwend | 228/180.2 |

FOREIGN PATENT DOCUMENTS 57-133606  8/1982  Japan .

OTHER PUBLICATIONS

J. Lamoureux, C. Morand and B. Pottier, "Used Electronic Module Pin Solder Dress Process", *IBM Technical Disclosure Bulletin*, vol. 24, No. 10, Mar. 1982.

*Primary Examiner*—Peter D. Rosenberg
*Attorney, Agent, or Firm*—Charles D. Gunter, Jr.

[57] ABSTRACT

A no clean thermally dissipated soldering flux is shown which includes camphor as a flux base, an organic activator and an organic diluent. The camphor provides a tacky yet fluid medium which is thermally dissipated during the flux operation and leaves no undesirable residue which would require a postcleaning step.

13 Claims, No Drawings

THERMALLY DISSIPATED SOLDERING FLUX

BACKGROUND OF THE INVENTION

1. Technical Field

The present invention relates to soldering fluxes and their use in processes for soldering members, particularly metallic members together. The flux compositions of the invention are particularly useful in the field of microelectronics, such as in the preparation of integrated circuit modules and integrated circuit boards.

2. Description of the Related Art

A common task in the manufacture of microelectronic components involves the manufacture of single chip or multi-chip modules having input/output pins which are inserted into a substrate. The input/output pins provide the needed electrical connections to the integrated circuit chip or chips which are subsequently connected to the substrate or carrier. In other presently known manufacturing processes, a chip is soldered directly to a printed circuit board. With either process, solder flux compositions have typically been applied to the pins in order to connect the component to the selected substrate, for instance, the printed circuit board. Flux compositions are employed to remove oxides from the pins and to prevent the pins from oxidizing when subjected to elevated temperatures for soldering, thereby serving to maintain the electrical conductivity of the pins. Once the solder is applied, any flux composition or residue remaining on the pins and substrates must be removed to provide as clean a substrate as possible. In the past, this has meant that an extra step of flux removal was necessary in the manufacturing process.

The soldering operation, in general, and flux removal, in particular, is increasingly difficult when applied to microelectronics. The pieces to be joined are extremely small, making cleaning, tinning, postcleaning and inspection difficult. In some cases, to avoid over heating, only the lead portion of the parts to be joined can be heated during the soldering operation. Cleaning and postcleaning are difficult due to the small size of the component, their large numbers, and the potential damage to the electronics by the cleaning solutions used, if any. Another problem source results from the fact that many of the known soldering fluxes are corrosive. In the environment of microelectronics, corrosion from any residual flux can ruin an extremely costly device.

Many of the organic water soluble fluxes presently available contain corrosive materials such as halides. A flux composition which contains free halogen can result in conversion to hydroacids and corresponding halide ions by hydrolysis at the soldering temperature. Hydroacids can further react with organic materials present in the flux to free halide ions. Accordingly, if the flux residue is not entirely removed, it will lead to corrosion of the parts soldered.

Because of these problems, so-called "non-activated" rosin fluxes have been used in the past in the microelectronic environment. This has not generally provided an acceptable solution, however, since the pure rosin alone is limited in oxide removal capability and can require rework to produce an acceptable product.

To improve the pure rosin flux oxide removal capability, a number of "activated" or "mildly activated" rosin fluxes have been developed. These products have several shortcomings, including the necessity of a cleaning step to ensure the removal of corrosive agents left behind after the soldering operation. For instance, it was often necessary to employ a hot water rinse in combination with neutralization or a mild hydrochloric acid solution in combination with a hot water rinse and neutralization or to use specialized water-based detergents. These cleaning steps were extremely difficult during the assembly of chips to integrated circuit board where the low stand-off height of the chip to the substrate (typically 0.002 inches-0.004 inches) made it extremely difficult to clean underneath the chip with an aqueous or non-solvent process.

Other of the commercially available low residue fluxes which we have tested have proved to be too thin, running out from under the chip during the manufacturing operation and failing to hold it in place.

The present invention has as its object to provide a soldering flux which thermally dissipates after solder reflow so that no visible residue is left on the printed circuit substrate which would be visible with conventional inspection techniques such as light microscopy, or visual inspection at low powers of magnification.

Another object of the invention is to provide a "no cleaning" necessary flux which results in manufacturing cost savings and which is environmentally superior, requiring no chemical reclamation or waste treatment.

Another object of the invention is to provide a "soldering" flux having a novel flux base component which provides superior wetting properties and which provides a flux which remains tacky after application, holding a precisely aligned chip in proper position.

Another object is to provide a thermally dissipated soldering flux having the required activity to remove oxides present on the substrate to thereby promote adequate bonding.

Additional objects, features and advantages will be apparent in the following written description.

SUMMARY OF THE INVENTION

The thermally dissipating soldering flux of the invention comprises of camphor as a flux base to provide an appropriately tacky yet fluid medium for the flux, a liquid solvent or diluent, such as isopropyl alcohol, and an organic activator composition, such as an aliphatic dicarboxylic acid. By combining these ingredients, a liquid solder flux is produced which remains tacky after application, holding a precisely aligned chip in position for reflow, and which is subsequently thermally dissipated leaving no visible residue which would require cleaning.

The method of the invention is used for fluxing the surface of a portion on a piece, such as the pin of an integrated circuit chip and/or the circuit pad on the substrate. The portion to be fluxed is contacted with the soldering flux of the invention consisting essentially of a mixture of camphor as a flux base, an organic activator and an organic diluent. The contacted portion is then heated to a temperature at which the organic activator reacts with oxides present on the surface of the portion of the piece and the solution evaporates leaving no residue.

In joining the chip to a substrate, such as a printed circuit board, the pin and a selected area on the substrate are fluxed using the composition of the invention. A metallic solder is then applied to at least one of the chip and substrate to be joined at a temperature above the melting point of the solder. The chip and substrate are contacted at a temperature above the melting point of the metallic solder and then cooled to a temperature below the melting point of the solder, thereby joining the contacted portions together, without any postcleaning of the joined components.

DETAILED DESCRIPTION OF THE PREFERRED EMBODIMENT

The soldering flux compositions of the invention comprise (1) camphor as a flux base; (2) an organic solvent or diluent; and (3) an organic activator of the type which reacts with oxides present on the surface to be fluxed.

The camphor used in the soldering flux of the invention is a known material and is commercially available from a number of sources. It occurs naturally in the camphor tree, *Laurus camphora* and can be synthesized from vinyl chloride and cyclopentadiene. The partial synthesis from pinene is also an important source. It is a translucent mass with a fragrant, penetrating odor and has a slightly bitter, cooling taste. It sublimes appreciably at room temperature and pressure, has a molecular weight of approximately 152.24, a melting point of approximately 175° C. plus or minus 2° C. It is commercially available from, for instance, Aldrich Chemical Co. Inc., of Milwaukee, Wis., Sigma Chemical Co., of St. Louis, Mo., and Eastman Kodak Co. of Rochester, N.Y., as "dl-camphor", preferably, in the 96% pure form.

The camphor component is employed in the compositions of the present invention in amounts of about 10 to about 20%, most preferably about 14–15%, by weight of the total flux composition.

The compositions of the present invention also contain an organic activator which is effective to remove oxides present on the surface to be fluxed and which improves wetting of the substrate. Preferably, the organic activator is ephemeral in nature, completely dissipating when heated in the range of about 200° C. and above. The known organic activators include, for example, aliphatic dicarboxylic acids having about 2 to 6 carbon atoms, i.e., oxalic acid, malonic acid, succinic acid, glutaric acid and adipic acid. Other organic activators are referenced in the literature and include, for instance, ethylene diamine tetraacetic acid and/or diethylene triamine pentaacetic acid and/or sodium salts thereof. A particularly preferred organic activator for the present purpose is adipic acid HOCO(CH$_2$)$_4$COOH. Adipic acid is a white crystalline solid having a molecular weight of approximately 146.14, and a melting point of 153° C. It is found naturally in beet juice and can be prepared by oxidizing cyclohexanol with concentrated nitric acid. It is commercially available from Aldrich Chemical Co., Inc., Sigma Chemical Co. and Eastman Kodak Co.

The organic activator component of the soldering fluxes of the invention is present in the range from about 1 to 10% by weight, preferably about 1 to 5%, most preferably about 2.0 to 2.5% by weight of the total flux composition.

The remainder of the soldering fluxes of the invention is substantially at least one organic solvent or diluent which will evaporate during the reflow operation. A variety of evaporative organic solvents are known, the preferred diluent being an aliphatic alcohol having about 1 to 4 carbon atoms, i.e., methyl alcohol, ethyl alcohol, isopropyl alcohol, n-propyl alcohol, isobutyl alcohol and n-butyl alcohol. Other organic solvents which are known to be operative include tetrahydrofuran, acetone, ethyl acetate, ethyl formate, hexane, methylene chloride, benzene, toluene, cyclohexanone, and mixtures thereof. However, the aliphatic alcohols are preferred because of the absence of objectionable odors, adverse reaction with the other ingredients and because of the lack of environmental and health concerns.

The organic diluent component of the soldering fluxes of the invention is present in the range from about 60 to 90% by weight, preferably about 80 to 90% by weight, most preferably about 83% by weight.

The following non-limiting examples are presented in order to further illustrate the present invention:

EXAMPLE I

A soldering flux of the invention was prepared by mixing 60 ccs of isopropyl alcohol, 10 grams of camphor (96% pure) and approximately 2 grams of adipic acid (2.5% by weight). This can conveniently be accomplished by dissolving the camphor in the isopropyl alcohol and adding the organic acid.

In order to test the effectiveness of the soldering flux so prepared, a number of pull tests were conducted in which the force in pounds required to dislocate a chip pin from a substrate was measured using an INSTRON Pull Tester. The results for the compositions of the invention are shown in Table I as compared to the results obtained from two commercially available fluxes. Table II shows the result of visual card inspections in which pins soldered using the fluxes of the invention are compared to pins soldered using the same two commercially available fluxes.

The soldering fluxes of the invention were superior in pull strength and free of dimples or craters. Note that a number of the Type II test chips were off registration due to the excessively thin nature of the solder flux.

TABLE I

| FLUX SOLDERABILITY - PULL TEST DATA (in units of lbs.) | | | | | |
|---|---|---|---|---|---|
| Composition I Of Invention | | Type I Commercial* | | Type II Commercial* | |
| Front | Front | Back | Front | Front | |
| 3.75 | 3.8 | 4.2 | 3.3 | 4.0 | |
| 4.2 | 2.8 | 3.1 | 3.6 | 3.2 | |
| 3.5 | 3.2 | 3.2 | 3.8 | 1.2 | |
| 3.5 | 3.2 | 3.0 | 3.5 | 3.5 | |
| 4.3 | 4.0 | 3.0 | 4.5 | 4.3 | |
| Back | Back | Front | Back | Back | |
| 6.0 | 6.0 | 3.8 | 3.0 | .5 | These chips |
| 4.0 | 6.0 | 3.2 | 3.0 | .25 | were off |
| 4.0 | 4.0 | 2.8 | 3.8 | .7 | registration. |
| 5.2 | 6.0 | 2.5 | 3.75 | 1.5 | |
| 5.2 | 4.5 | 3.2 | 3.0 | .5 | |

*mildly activated rosin flux
*active flux, not rosin based

TABLE II

| CARD INSPECTIONS | | | | | |
|---|---|---|---|---|---|
| Composition I Of The Invention | | | | | |
| Card 1 - Front - # bonds/site | 36 | 36 | 36 | 36 | 36 |
| # no bonds/site | 0 | 0 | 0 | 0 | 0 |
| Back - # pulls/site | 35 | 36 | 36 | 36 | 36 |
| # no bonds/site | 1 | 0 | 0 | 0 | 0 |
| (circuit was flat - no solder on pad) | | | | | |
| Card 2 - Front - # bonds/site | 36 | 36 | 36 | 36 | 36 |
| # no bonds/site | 0 | 0 | 0 | 0 | 0 |
| Back - # bonds/site | 36 | 36 | 36 | 36 | 36 |
| # no bonds/site | 0 | 0 | 0 | 0 | 0 |
| Type I Commercial | | | | | |
| Card 1 - Front - # bonds/site | 34 | 36 | 35 | 32 | 36 |

TABLE II-continued

CARD INSPECTIONS

|  |  |  |  |  |  |  |
|---|---|---|---|---|---|---|
|  | # dimples/site (crater) | 1 | 0 | 0 | 1 | 0 |
|  | # no bonds/site | 1 | 0 | 1 | 3 | 0 |
| Back - | # pulls/site | 30 | 35 | 32 | 35 | 31 |
|  | # dimples/site | 5 | 0 | 3 | 0 | 0 |
|  | # no bonds/site | 1 | 1 | 1 | 1 | 5 |
| Card 2 - Front - | # bonds/site | 36 | 36 | 36 | 35 | 36 |
|  | # dimples/site | 0 | 0 | 0 | 0 | 0 |
|  | # no bonds/site | 0 | 0 | 0 | 1 | 0 |
|  | registration off (slightly) | N | N | N | Y | N |
|  | # shorts/site | 0 | 0 | 0 | 0 | 0 |
| Back - | # bonds/site | 36 | 27 | 35 | 35 | 36 |
|  | # dimples/site | 0 | 6 | 0 | 0 | 0 |
|  | # no bonds/site | 0 | 3 | 1 | 1 | 0 |
|  | registration off | N | Y | N | N | Y |
|  | # shorts/site | 0 | 0 | 0 | 0 | 1 |
| Type II Commercial |  |  |  |  |  |  |
| Card 1 - Front - | # bonds/site | 29 | 32 | 11 | 36 | 36 |
|  | # dimples/site | 4 | 2 | 10 | 0 | 0 |
|  | # no bonds/site | 3 | 0 | 13 | 0 | 0 |
|  | # no solder on pad/site | 0 | 2 | 2 | 0 | 0 |
|  | registration off | N | N | N | N | N |
| Back - | # bonds/site | 8 | 5 | 8 | 20 | 5 |
|  | # dimples/site |  | 1 |  | 5 | 3 |
|  | # no bonds/site | 28 | 29 | 27 | 11 | 27 |
|  | # no solder on pad/site | 0 | 1 | 1 | 0 | 1 |
|  | registration off | Y | Y | Y | Y | Y |

EXAMPLE II

A soldering flux of the invention was prepared by mixing 60 ccs of isopropyl alcohol; 10 grams of camphor (96% pure) and approximately 2 grams (2.5% by weight) of succinic acid. The test results obtained were similar to those obtained in Example I above.

An invention has been provided with several advantages. The soldering flux of the invention is thermally dissipated during use and leaves no visible residue which would require a postcleaning operation. The soldering flux of the invention exhibits superior wettability producing the activity needed to effectively remove oxides on the surface to be fluxed. The camphor component provides a tacky yet fluid medium which holds a precisely aligned chip in place during reflow and which requires no cleaning. The composition exhibits no corrosivity even if left on the card for a period of time before or after the soldering operation. The only by-products of the flux of the invention are inert and leave no undesirable residue. The compositions can be formulated without the use of chemicals which are environmental and/or health hazards.

While the invention has been particularly shown and described with reference to a preferred embodiment, it will be understood by those skilled in the art that various changes in form and detail may be made therein without departing from the spirit and scope of the invention.

We claim:

1. A thermally dissipated no clean soldering flux adapted for use in assembling chips to integrated circuit boards where the stand off height of the chips to the boards is on the order of about 0.002 inches to 0.004 inches, the flux comprising:
   from about 10 to about 20% by weight of camphor as a flux base;
   from about 1 to 5% by weight of an organic activator;
   the remainder being substantially at least one organic diluent; and
   wherein the flux is characterized by the absence of halogen and rosin components and is thermally dissipated, in use, leaving no visible residue which would require a post cleaning step.

2. The thermally dissipated soldering flux of claim 1, wherein said organic activator is an aliphatic dicarboxylic acid having about 2 to 6 carbon atoms.

3. The thermally dissipated soldering flux of claim 2, wherein said organic activator is selected from the group consisting of:
   oxalic acid, malonic acid, succinic acid, glutaric acid and adipic acid.

4. The thermally dissipated soldering flux of claim 1, wherein said organic diluent is an aliphatic alcohol having about 1 to 4 carbon atoms.

5. The hermally dissipated soldering flux of claim 4, wherein said organic diluent is selected from the group consisting of:
   methyl alcohol, ethyl alcohol, isopropyl alcohol, n-propyl alcohol, isobutyl alcohol and n-butyl alcohol.

6. A method for fluxing the surface of a portion on a piece, comprising the steps of:
   furnishing a piece to be fluxed;
   contacting the portion to be fluxed with a solution consisting essentially of a mixture of about 10 to 20% by weight camphor as a flux base, from about 1 to 5% adipic acid as an organic activator and an organic diluent; and
   heating the contacted portion to a temperature at which the organic activator reacts with oxides present on the surface and the solution evaporates.

7. The method of claim 6 wherein the organic activator employed is an aliphatic dicarboxylic acid having about 2 to 6 carbon atoms.

8. The method of claim 7, wherein the organic activator employed is selected from the group consisting of:
   oxalic acid, malonic acid, succinic acid, glutaric acid and adipic acid.

9. The method of claim 8, wherein the organic diluent is an aliphatic alcohol having about 1 to 4 carbon atoms.

10. A method for joining portions of two pieces, comprising the steps of:
    furnishing the two pieces to be joined;
    contacting the portions to be joined to a solution consisting essentially of about 10 to 20% be weight camphor as a flux base, about 1 to 5% by weight adipic acid as an acid activator and the remainder being an alcohol diluent;
    applying a metallic solder to at least one of the portions to be joined to tin the portion at a temperature above the melting temperature of the solder; and
    contacting the two portions to be joined at a temperature above the melting point of the metallic solder and then cooling the contacted portions to a temperature below the melting point of the metallic solder, thereby joining the contacted portions together, the method being carried out without any postcleaning of the joined components.

11. The method of claim 10, wherein at least one of the pieces is an electronic component.

12. The method of claim 11, wherein one of said pieces is an electronic chip and one of said pieces is a printed circuit board.

13. A thermally dissipated no clean soldering flux consisting essentially of:

from about 10 to about 20% by weight of camphor as a flux base;
from about 1 to 5% by weight of adipic acid as an organic activator;
the remainder being an organic diluent; and
wherein the flux is characterized by the absence of halogen and rosin components and is thermally dissipated, in use, leaving no visible residue which would require a postcleaning step.

* * * * *